United States Patent
Shao et al.

(10) Patent No.: US 11,860,978 B2
(45) Date of Patent: Jan. 2, 2024

(54) METHODS AND SYSTEMS FOR DETECTING DETECTION DEVICES LOCATED AT ENERGY METERING POINTS OF NATURAL GAS

(71) Applicant: CHENGDU QINCHUAN IOT TECHNOLOGY CO., LTD., Sichuan (CN)

(72) Inventors: Zehua Shao, Chengdu (CN); Haitang Xiang, Chengdu (CN); Yaqiang Quan, Chengdu (CN); Bin Liu, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/061,474

(22) Filed: Dec. 4, 2022

(65) Prior Publication Data
US 2023/0098183 A1   Mar. 30, 2023

Related U.S. Application Data

(63) Continuation of application No. 17/649,343, filed on Jan. 28, 2022, now Pat. No. 11,562,182.

(30) Foreign Application Priority Data

Feb. 4, 2021  (CN) .......................... 202110155161.8
Jan. 14, 2022  (CN) .......................... 202210045109.1

(51) Int. Cl.
  *G06F 18/2413*  (2023.01)
  *G06F 18/23*  (2023.01)
  *G06F 11/30*  (2006.01)

(52) U.S. Cl.
  CPC ...... *G06F 18/2413* (2023.01); *G06F 11/3089* (2013.01); *G06F 18/23* (2023.01)

(58) Field of Classification Search
  CPC ... G06F 18/2413; G06F 18/23; G06F 11/3089
  See application file for complete search history.

(56) References Cited

U.S. PATENT DOCUMENTS

2008/0224892 A1  9/2008 Bogolea et al.
2011/0039173 A1  2/2011 Kanazu
(Continued)

FOREIGN PATENT DOCUMENTS

AU   2013100843 A4   7/2013
CN   101246035 A     8/2008
(Continued)

OTHER PUBLICATIONS

First Office Action in Chinese Application No. 202110155161.8 dated Nov. 24, 2021, 12 pages.
(Continued)

*Primary Examiner* — Manuel L Barbee
(74) *Attorney, Agent, or Firm* — METIS IP LLC

(57) ABSTRACT

The present disclosure provides an early warning method and an early warning system for a detection device located at an energy metering point of natural gas, comprising: obtaining a first detection data set collected by the detection device located at the energy metering point of the natural gas, determining a first cluster center set through clustering a first historical detection data set, determining a first vector corresponding to the first detection data set based on the first detection data set, determining a first target cluster center based on the first vector and the first cluster center set; and determining whether the detection device is abnormal based on a distance between the first vector and the first target cluster center.

13 Claims, 9 Drawing Sheets

(56) References Cited

U.S. PATENT DOCUMENTS

| | | | |
|---|---|---|---|
| 2017/0285079 A1* | 10/2017 | Duncan-Wilson | ........................... G06Q 30/0201 |
| 2020/0302558 A1 | 9/2020 | Shao | |
| 2020/0327009 A1 | 10/2020 | Callison et al. | |
| 2021/0377098 A1* | 12/2021 | Shirvani | ............... H04L 41/064 |
| 2021/0390802 A1 | 12/2021 | Sass et al. | |

FOREIGN PATENT DOCUMENTS

| | | | |
|---|---|---|---|
| CN | 101255947 A | 9/2008 |
| CN | 203572516 U | 4/2014 |
| CN | 105807027 A | 7/2016 |
| CN | 106896727 A | 6/2017 |
| CN | 109634942 A | 4/2019 |

OTHER PUBLICATIONS

Chen, Gengliang, Energy Metering of Natural Gas and its Standardization, Technical Supervision of Petroleum Industry, 2001, 8 pages.

Wang, Chi et al., The System and Method for Energy Measurement of Natural Gas, Acta Metrologica Sinica, 29(5): 403-406, 2008.

Wu, Huanfen, Research on Key Technology of Natural Gas Energy Measurement, Chinese Doctoral Dissertations and Master's Theses Full-text Database (Master) Information Science and Technology I, 2013, 71 pages.

Decision to Grant a Patent for Invention in Chinese Application No. 202110155161.8 dated Apr. 1, 2022, 4 pages.

\* cited by examiner

300

Obtaining a first detection data set collected by a detection device located at an energy metering point of natural gas ⟶ 310

Determining whether the detection device is abnormal based on the first detection data set and a first historical detection data set ⟶ 320

FIG. 3 is a continuation of U.S. patent application Ser. No. 17/649,343, filed on Jan. 28, 2022, which claims priority to Chinese Patent Application No. 202110155161.8 filed on Feb. 4, 2021 and Chinese Patent Application No. 202210045109.1 filed on Jan. 14, 2022, the contents of which are hereby incorporated by reference to its entirety.

METHODS AND SYSTEMS FOR DETECTING DETECTION DEVICES LOCATED AT ENERGY METERING POINTS OF NATURAL GAS

CROSS-REFERENCE TO RELATED APPLICATIONS

The application is a continuation of U.S. patent application Ser. No. 17/649,343, filed on Jan. 28, 2022, which claims priority to Chinese Patent Application No. 202110155161.8 filed on Feb. 4, 2021 and Chinese Patent Application No. 202210045109.1 filed on Jan. 14, 2022, the contents of which are hereby incorporated by reference to its entirety.

TECHNICAL FIELD

The present disclosure relates to the field of gas detection, and in particular to methods and systems for detecting detection devices located at energy metering points of natural gas.

BACKGROUND

As the use of natural gas becomes more and more frequent by human, the standards of detection devices of natural gas are also increasing. However, no matter how excellent the detection devices are, the damage of the detection devices can not be avoided.

Therefore, it is desirable to provide methods and systems for detecting detection devices located at energy metering points of natural gas to determine whether the detection devices of natural gas are abnormal.

SUMMARY

One aspect of some embodiments of the present disclosure provides an early warning method for a detection device located at an energy metering point of natural gas. The method may include obtaining a first detection data set collected by the detection device located at the energy metering point of natural gas, determining a first cluster center set through clustering a first historical detection data set, determining a first vector corresponding to the first detection data set based on the first detection data set, determining a first target cluster center based on the first vector and the first cluster center set, and determining whether the detection device is abnormal based on a distance between the first vector and the first target cluster center.

One aspect of some embodiments of the present disclosure provides an early warning system for a detection device located at an energy metering point of natural gas. The system may include at least one storage medium storing a set of instructions, and at least one processor in communication with the at least one storage medium to execute the set of instructions to perform operations. The operations comprise: obtaining a first detection data set collected by the detection device located at the energy metering point of the natural gas, determining a first cluster center set through clustering a first historical detection data set, determining a first vector corresponding to the first detection data set based on the first detection data set, determining a first target cluster center based on the first vector and the first cluster center set, and determining whether the detection device is abnormal based on a distance between the first vector and the first target cluster center.

One aspect of some embodiments of the present disclosure provides a non-transitory computer readable medium storing instructions. When the instructions are executed by at least one processor, the at least one processor implements an early warning method comprising: obtaining a first detection data set collected by a detection device located at the energy metering point of natural gas, determining a first cluster center set through clustering a first historical detection data set, determining a first vector corresponding to the first detection data set based on the first detection data set, determining a first target cluster center based on the first vector and the first cluster center set, and determining whether the detection device is abnormal based on a distance between the first vector and the first target cluster center.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 3 is a flowchart illustrating an exemplary process of a method for detecting a detection device located at an energy metering point of natural gas according to some embodiments of the present disclosure;

DETAILED DESCRIPTION

Figure 1:
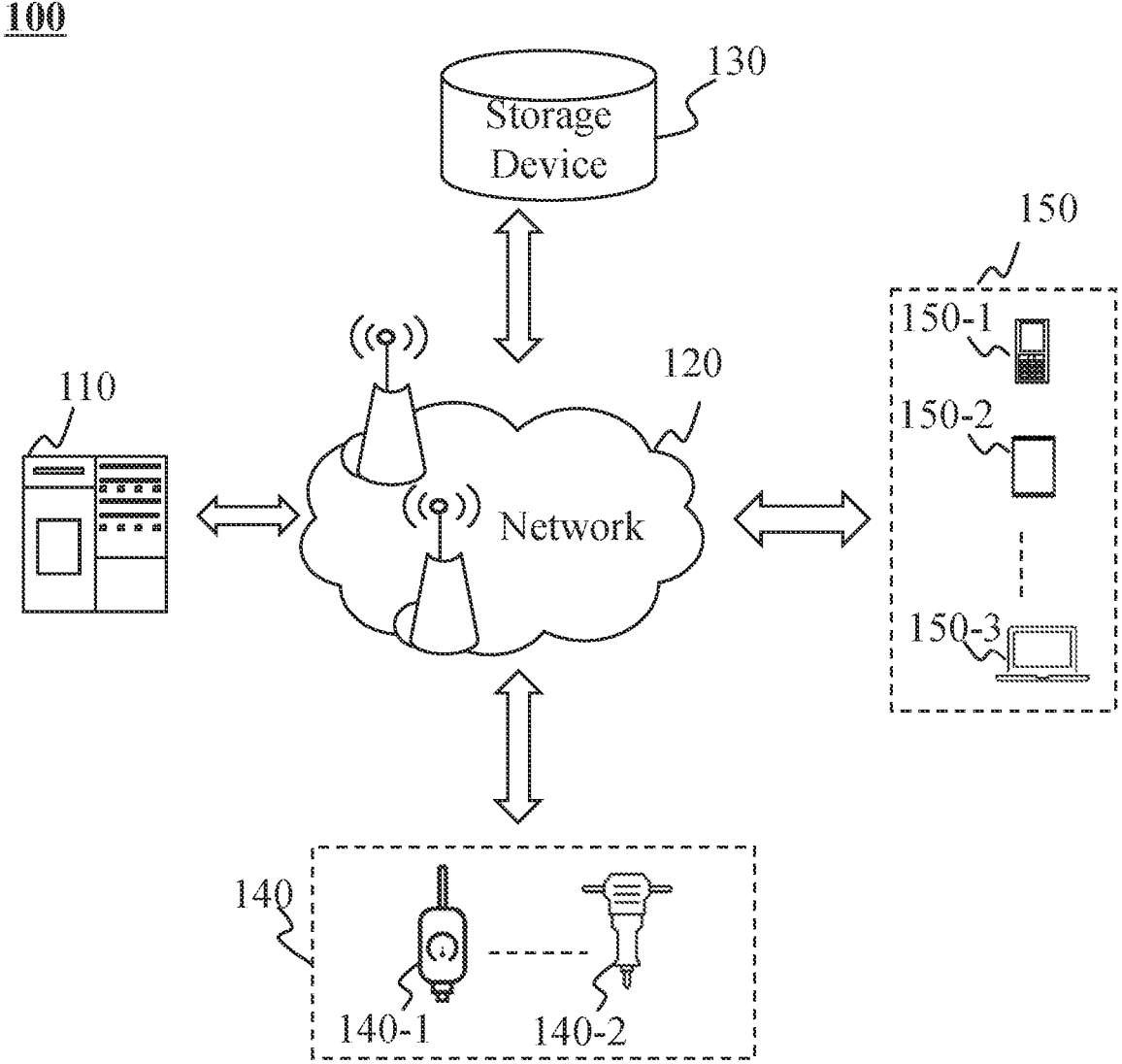
FIG. 1 is a schematic diagram illustrating an exemplary application scenario of a system for detecting a detection device located at an energy metering point of natural gas according to some embodiments of the present disclosure.

In the following detailed description, numerous specific details are set forth by way of examples in order to provide a thorough understanding of the relevant disclosure. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

It will be understood that the terms "system," "device," "unit," and/or "module" used herein are one method to distinguish different components, elements, parts, sections, or assemblies of different levels. However, the terms may be displaced by another expression if they achieve the same purpose.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

FIG. 1 is a schematic diagram illustrating an exemplary application scenario of a system for detecting a detection device located at an energy metering point of natural gas according to some embodiments of the present disclosure.

As shown in FIG. 1, in some embodiments, the application scenario 100 may at least include a processing device 110, a network 120, a storage device 130, a detection device 140, and a terminal 150.

The processing device 110 may be configured to process data and/or information from at least one component or external data source (e.g., a cloud data center) of the application scenario 100. The processing device 110 may access data and/or information from the storage device 130, the detection device 140, and the terminal 150 via the network 120. The processing device 110 may be directly connected with the storage device 130, the detection device 140, and the terminal 150 to access information and/or data. For example, the processing device 110 may obtain detection data and/or information from the detection device 140 and process the obtained data and/or information. For example, the processing device 110 may determine whether the detection device is abnormal based on the obtained data and/or information. In some embodiments, the processing device 110 may be a single processing device or a processing device group. The processing device 110 may be local or remote. The processing device 110 may be implemented on a cloud platform.

The network 120 may include any suitable network that is capable of promoting information and/or data exchange of the application scenario 100. In some embodiments, information and/or data may be exchanged via the network 120 between one or more components (e.g., the processing device 110, the storage device 130, the detection device 140, and the terminal 150) of the application scenario 100. The network 120 may include a local area network (LAN), a wide area network (WAN), a wired network, a wireless network, or the like, or any combination thereof. In some embodiments, the network 120 may be any one or more of a wired network or a wireless network. In some embodiments, the network 120 may include one or more network access points. For example, the network 120 may include wired or wireless network access points, such as base stations and/or network switching points. One or more components of the application scenario 100 may be connected with the network 120 to exchange data and/or information through the wired or wireless network access points.

The storage device 130 may be configured to store data, instructions, or the like, or any combination thereof. In some embodiments, the storage device 130 may store data and/or information obtained from at least one component of the application scenario 100. For example, the storage device 130 may store first historical detection data sets. As another example, the storage device 130 may store a correction model. In some embodiments, the storage device 130 may also include mass memory, removable memory, or the like, or any combination thereof.

The detection device 140 may be a device for obtaining relevant data or information of natural gas located at the energy metering point of natural gas. In some embodiments, the detection device 140 may detect flow rate, temperature, pressure, or composition of natural gas, concentration, content, flow rate, compression factor, density, calorific value of different compositions, or the like, or any combination thereof. In some embodiments, the detection device 140 may send the collected related data or information of natural gas to other components of the application scenario 100 (e.g., the processing device 110) or other components other than the application scenario 100 (e.g., a toll station of natural gas) via the network 120. In some embodiments, the detection device 140 may include one or more data detection units to detect different parameters of natural gas respectively. For example, the detection device 140 may include a temperature sensor 140-1, a pressure sensor 140-2, other data detection units, or the like.

The terminal 150 may refer to one or more terminal devices or software used by a user. In some embodiments, the terminal 150 may include a mobile device 150-1, a tablet 150-2, a laptop 150-3, or the like, or any combination thereof. In some embodiments, the user may interact with other components in the application scenario 100 through the terminal 150. For example, the user may receive a first detection data detected by the detection device 140 through the terminal 150. In some embodiments, the user may control other components of the application scenario 100 through the terminal 150. For example, the user may control the detection device 140 through the terminal 150 to detect the relevant parameters of the energy metering point of natural gas. In some embodiments, the user may obtain a state of the detection device located at the energy metering point of natural gas through the terminal 150.

Figure 2:
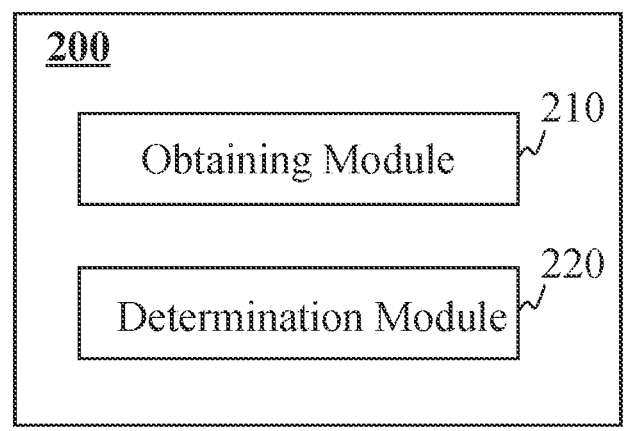
FIG. 2 is a block diagram illustrating an exemplary system for detecting a detection device located at an energy metering point of natural gas according to some embodiments of the present disclosure.

FIG. 2 is a block diagram illustrating an exemplary system for detecting a detection device located at an energy metering point of natural gas according to some embodiments of the present disclosure.

In some embodiments, a system 200 for detecting a detection device located an energy metering point of natural gas may include an obtaining module 210 and a determination module 220.

In some embodiments, the obtaining module 210 may be configured to obtain a first detection data set collected by the detection device located at the energy metering point of natural gas. More descriptions regarding the energy metering points of natural gas, the detection devices, and the first detection data set may be found elsewhere in the present disclosure, for example, FIG. 3 and its relevant descriptions thereof.

In some embodiments, the determination module 220 may be configured to determine whether the detection device is abnormal based on the first detection data set and a first historical detection data set. More descriptions regarding the first historical detection data set and a method for determining whether the detection device is abnormal may be found elsewhere in the present disclosure, for example, FIG. 3 and its relevant descriptions thereof.

In some embodiments, the determination module may be further configured to determine a first cluster center set through clustering the first historical detection data set, determine a first vector corresponding to the first detection data set based on the first detection data set, determine a first target cluster center based on the first vector and the first cluster center set, and determine whether the detection device is abnormal based on a first distance between the first vector and the first target cluster center. More descriptions regarding the first cluster center set, the first vector, and the first target cluster center may be found elsewhere in the present disclosure, for example, FIG. 4 and its relevant descriptions thereof.

In some embodiments, the determination module may be further configured to perform the following operations for each of sub detection data in the first detection data set in response to determining that the detection device is abnormal: obtain a second vector through removing an element corresponding to the sub detection data from the first vector, obtain a second target clustering center through removing an element corresponding to the sub detection data from the first target clustering center, and determine whether the data detection unit corresponding to the sub detection data is an abnormal data detection unit based on a second distance between the second vector and the second target clustering center. More descriptions regarding the second vector, the second target cluster center, and the abnormal data detection unit may be found elsewhere in the present disclosure, for example, FIG. 4 and its relevant descriptions thereof.

In some embodiments, the determination module may be further configured to perform the following operations for each of the sub detection data in the first detection data set: obtain a second historical detection data set through removing historical sub detection data corresponding to the sub detection data in the first historical detection data set, determine a second cluster center set based on the second historical detection data set, obtain a second detection data set through removing the sub detection data from the first detection data set, determine a third vector corresponding to the second detection data set based on the second detection data set, determine a third target cluster center based on the third vector and the second cluster center set, and determine whether the data detection unit corresponding to the sub detection data is an abnormal data detection unit based on a third distance between the third vector and the third target clustering center. More descriptions regarding the second historical detection data set, the second cluster center set, the second detection data set, the third vector, the third target cluster center may be found elsewhere in the present disclosure, for example, FIG. 5 and its relevant descriptions thereof.

In some embodiments, the determination module may be further configured to obtain abnormal sub detection data corresponding to the abnormal data detection unit in the first detection data set, obtain corrected detection data through correcting the abnormal sub detection data based on the first detection data set, and obtain a target detection data set based on the corrected detection data and the first detection data set. More descriptions regarding the normal sub detection data, the corrected detection data, and the target detection data may be found elsewhere in the present disclosure, for example, FIG. 6 and its relevant descriptions thereof.

In some embodiments, the determination module may be further configured to obtain a third detection data set through removing the abnormal sub detection data in the first detection data set and determine the corrected detection data through processing the third detection data set based on a correction model. More descriptions regarding the third detection data set and the corrected detection data may be found elsewhere in the present disclosure, for example, FIG. 6 and its relevant descriptions thereof.

It should be noted that the above descriptions of each module are intended to be convenient, and one or more embodiments of the present disclosure may not be limited to the scope of the disclosure. It may be understood that after understanding the principle of the system, those skilled in the art may arbitrarily combine the modules or form a subsystem to connect with other modules without departing from the principle. In some embodiments, the obtaining module 210 and the determination module 220 shown in FIG. 2 may be different modules in a system or a module having functions of the above two or more modules. For example, each module may share a storage module, and each module may also have respective storage modules. Those variations and modifications may be within the scope of the protection of one or more embodiments of the disclosure.

FIG. 3 is a flowchart illustrating an exemplary process of a method for detecting a detection device located at an energy metering point of natural gas according to some embodiments of the present disclosure. In some embodiments, the process 300 may be executed by the processing device 110. As shown in FIG. 3, the process 300 may include the following steps:

In step 310, the processing device 110 may obtain a first detection data set collected by the detection device located at the energy metering point of natural gas. In some embodiments, step 310 may be executed by the obtaining module 210.

The energy metering point of natural gas may refer to one or more detection points for measuring natural gas. Units of the energy metering point of natural gas may be pre-divided. For example, the units of the energy metering points of natural gas may be cells. As another example, the units of the energy metering point of natural gas may be households. In some embodiments, one or more components in the natural gas at the energy metering point of natural gas may be detected by the detection device. For example, methane in natural gas. In some embodiments, one or more properties in natural gas at the energy metering point of natural gas may also be detected by the detection device. For example, temperature of natural gas. The processing device 110 may price the energy of natural gas based on the detected data.

The detection device may be a device for detecting various parameters of natural gas, which is located at the energy metering point of natural gas. In some embodiments, the detection device may include a plurality of data detection units, each of which may detect different parameters of natural gas. For example, the detection device may include one or more of a gas chromatograph for detecting composition of natural gas, a gas sensor for detecting concentration of each component in natural gas, a temperature sensor for detecting temperature of natural gas, a pressure sensor for detecting pressure of natural gas, or the like.

The first detection data set may be a set of data related to natural gas detected by the detection device. For example, a set of data constituted by various parameters obtained by the detection device each time. As another example, various parameters of natural gas (such as the composition of natural gas, the concentration of each component, the temperature of natural gas, the pressure of natural gas, etc.), which are detected at the energy metering point of natural gas in the past week, may be packaged into a data set. In some embodiments, the first detection data set may include sub detection data respectively collected by at least two data detection units in the detection device. For example, the detection device includes a gas chromatograph, a temperature sensor, and a pressure sensor. Accordingly, the first detection data set may include the composition of natural gas, the temperature of natural gas, and the pressure of natural gas.

The sub detection data may be the data detected by the corresponding data detection unit. The first detection data set may include one or more sub detection data. For example, the first detection data set may include three sub detection data, namely, the composition of natural gas detected by the gas chromatograph in the detection device, the temperature of the natural gas detected by the temperature sensor, and the pressure of the natural gas detected by the pressure sensor.

In step 320, the processing device 110 may determine whether the detection device is abnormal based on the first detection data set and a first historical detection data set. In some embodiments, step 320 may be executed by the determination module 220.

The first historical detection data set may be a set of data related to natural gas detected by the detection device in the past time period.

In some embodiments, the first historical detection data set may be the first detection data set of the same energy metering point of natural gas in the past time period. For example, the first historical detection data set may be the first detection data set of the same energy metering point of natural gas detected by the detection device in the past week. In some embodiments, the first historical detection data set may also be a set of detection data of natural gas of a plurality of energy metering points of natural gas including the energy metering point of natural gas in the past time period. For example, the energy metering point of natural gas is a family, and the first historical detection data set may be a set of detection data of natural gas of all energy metering points of natural gas in the cell including the family in the past week. In some embodiments, the first historical detection data set may also be a set of detection data of natural gas of one or more other energy metering points of natural gas in the past time period. For example, the energy metering point of natural gas is a family, and the first historical detection data set may be the set of detection data of natural gas of all energy metering points of natural gas in the cell other than the family in the past week. In some embodiments, the first set of historical detection data may be obtained from historical data of detection devices distributed at each energy metering point of natural gas. In some embodiments, the first historical detection data set may also be obtained by other means, for example, via a network.

It should be understood that it is necessary to determine whether the detection device corresponding to the first detection data set is abnormal based on the first historical detection data set. Therefore, the detection device corresponding to the first historical detection data set is a normal detection device, and the data in the first historical detection data set is normal detection data. In some embodiments, the normal detection data may be determined by multiple means, for example, by manual screening.

In some embodiments, the processing device 110 may determine whether the detection device is abnormal through analyzing and processing the first historical detection data set and the first detection data by modeling or using various data analysis algorithms, such as regression analysis, discriminant analysis, etc. In some embodiments, the first set of historical detection data may be one or more.

In some embodiments, the processing device 110 may determine whether the detection device is abnormal through processing the first historical detection data set by clustering algorithm and analyzing the first historical detection data set in combination with the first detection data set. More descriptions regarding processing the first historical detection data set by clustering algorithm and analyzing the first historical detection data set in combination with the first detection data set may be found elsewhere in the present disclosure, for example, FIGS. 4 and 5, and their relevant descriptions thereof.

According to some embodiments of the present disclosure, it is determined whether the detection device is abnormal based on the first historical detection data and the first detection data of the energy metering point of natural gas, which avoids special detection of the detection device, saves detection time, such that makes energy pricing of the natural gas at the energy metering point of natural gas more accurate.

Figure 4:
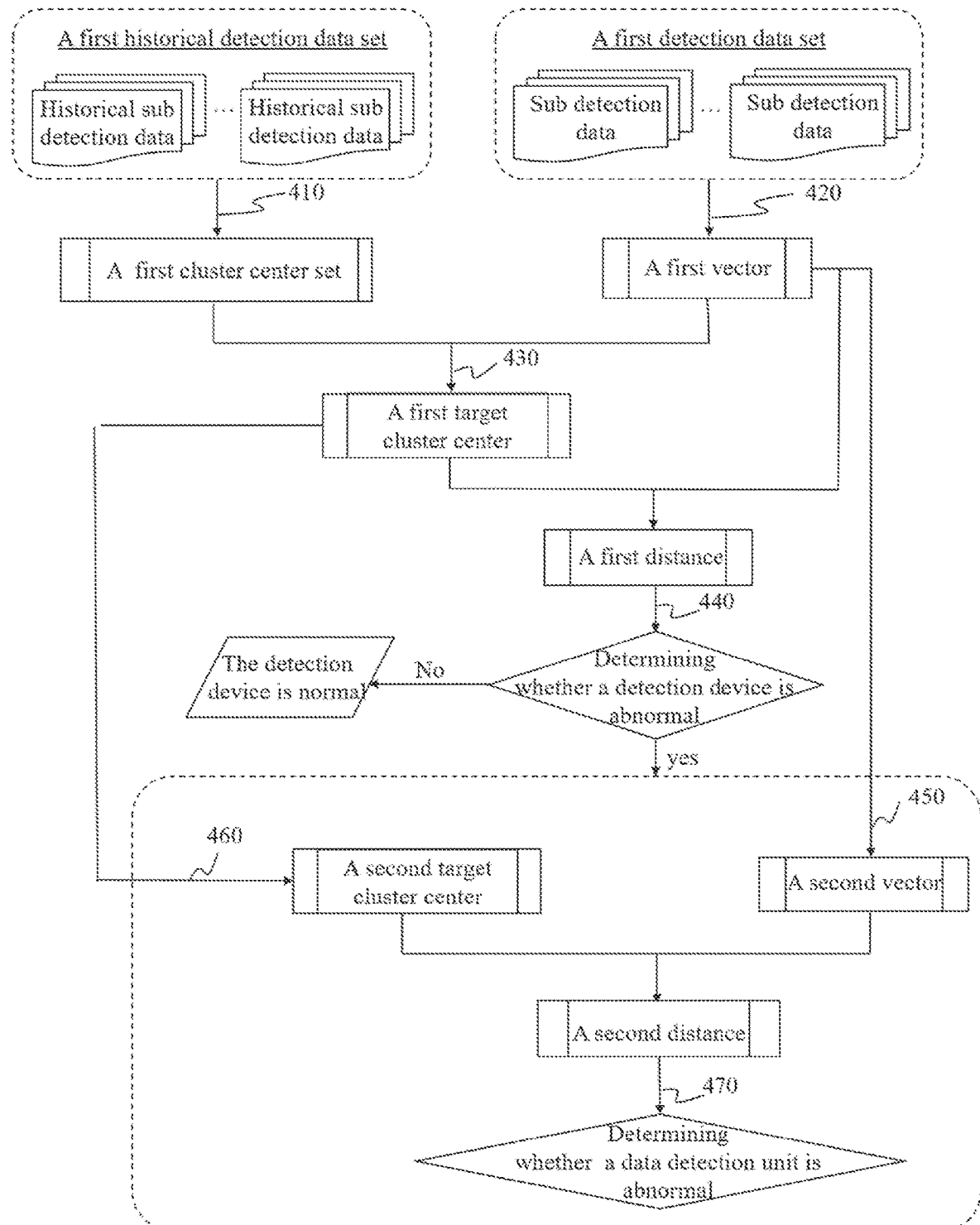
FIG. 4 is a schematic diagram illustrating an exemplary process for determining whether the detection device is abnormal according to some embodiments of the present disclosure.

FIG. 4 is a schematic diagram illustrating an exemplary process for determining whether the detection device is abnormal according to some embodiments of the present disclosure. In some embodiments, the process 400 may be executed by the determination module 220. As shown in FIG. 4, the process 400 may include the following steps:

Step 410, the processing device 110 may determine a first cluster center set through clustering the first historical detection data set.

In some embodiments, a feature vector of the first historical detection data set may be formed based on the first historical detection data set. The elements of the feature vector of the first historical detection data set may correspond to the first historical detection data set. A plurality of feature vectors of the first historical detection data sets may correspond to a plurality of first historical detection data sets, respectively. In some embodiments, the elements in the feature vector of the first historical detection data set may correspond to the content of components in natural gas and/or the parameters in the first historical detection data set. For example, the feature vector of the first historical detection data set may be (a, b, c, d, e, f, g), where "a-g" may represent seven kinds of detection data related to natural gas in the first historical detection data set respectively. For example, "a" represents methane concentration, "b" represents hydrocarbon concentration, "c" represents nitrogen concentration, "d" represents oxygen concentration, "e" represents carbon dioxide concentration, "f" represents sulfide concentration, and "g" represents the concentration of other substances. As another example, the feature vector of the first historical detection data set may also include "h" representing temperature and "i" representing pressure. Finally, the feature vector of the first historical detection data set (a, b, c, d, e, f, g, h, i) may be constructed. The elements in the feature vector of the first historical detection data set may also include other detection data, and the feature vector of the first historical detection data set may be constructed in a similar manner as described above.

In some embodiments, the value of the element in the feature vector of the first historical detection data set may be the actual detection value. In some embodiments, the actual detection values may be classified based on preset correspondence, and the classified detection values may be used as the values of the elements in the feature vector of the first historical detection data set. For example, "90%-91%" is represented by "1", "91%-92%" is represented by "2", etc.

In some embodiments, the determination module 220 may cluster the feature vectors of the first historical detection data set to determine the first cluster center set through the clustering algorithm, and the first cluster center set may include one or more cluster centers. For example, the first historical detection vector may be clustered to obtain the first cluster center set through the clustering algorithm, and the first cluster center set may include a cluster center I and a cluster center II.

The determination module 220 may cluster a plurality of first historical detection data sets based on the type of natural gas and/or supply area of natural gas. The types of clustering algorithms may include K-means clustering and/or clustering method (DBSCAN) based on density.

In step 420, the processing device 110 may determine a first vector corresponding to the first detection data set based on the first detection data set.

The first vector may be a feature vector corresponding to the first detection data set. The elements of the first vector may correspond to the first detection data set. For example, the first vector may be $(a_1, b_1, c_1, d_1, e_1, f_1, g_1)$, where "$a_1$-$g_1$" may respectively represent seven kinds of detection data related to natural gas in the first detection data set. For example, "$a_1$" represents methane concentration, "$b_1$" represents hydrocarbon concentration, "$c_1$" represents nitrogen gas concentration, "$d_1$" represents oxygen concentration, "$e_1$" represents carbon dioxide concentration, "$f_1$" represents sulfide concentration, and "$g_1$" represents the concentration of other substances. The determination method of the first vector is similar to the feature vector of the first historical detection data set. More descriptions regarding the first vector may be found elsewhere in the present disclosure, for example, the relevant descriptions of the feature vector of the first historical detection data set thereof.

In step 430, the processing device 110 may determine a first target cluster center based on the first vector and the first cluster center set.

The first target cluster center may refer to a cluster center closest to the first vector in the first cluster center set. In some embodiments, a distance between the first vector and each cluster center in the first cluster center set may be calculated, and the cluster center corresponding to the shortest distance may be determined as the first target cluster center. For example, the first target cluster center with the shortest distance from the first vector is $(A_1, B_1, C_1, D_1, E_1, F_1, G_1)$ through calculating the distance between the first vector and each cluster center in the first cluster center set. The method of calculating the distance may include Euclidean distance, cosine distance, Markov distance, Chebyshev distance, Manhattan distance, or the like, or any combination thereof.

In step 440, the processing device 110 may determine whether the detection device is abnormal based on a first distance between the first vector and the first target clustering center.

The first distance may refer to a vector distance between the first vector and the first target cluster center. The method of obtaining the first distance may include Euclidean distance, cosine distance, Markov distance, Chebyshev distance, Manhattan distance, or the like, or any combination thereof.

In some embodiments, the determination module 220 may determine whether the detection device is abnormal based on the comparison result obtained through comparing the first distance with a first threshold. The first threshold may be determined based on the user's actual experience in detecting the detection device. In some embodiments, when the first distance is greater than the first threshold, it is determined that the detection device is abnormal. when the first distance is less than or equal to the first threshold, it is determined that the detection device is normal.

In some embodiments, in order to obtain more specific detection results, the sub detection data in the first detection data set may also be analyzed and processed to further determine abnormal data detection units in the abnormal detection device. In some embodiments, the sub detection data in the first detection data set may be analyzed and processed to further determine the abnormal data detection units in the abnormal detection device. For each of sub detection data in the first detection data set, the following steps may be executed:

In step 450, the processing device 110 may remove an element corresponding to the sub detection data from the first vector to obtain a second vector.

The second vector may be the feature vector corresponding to the first detection data set with removing a certain sub detection data and may be used to represent the first detection data set with removing a certain sub detection data. In some embodiments, for a certain sub detection data, the first vector excluding the element corresponding to the sub detection data may be used as the second vector. For example, the first vector may be $(a_1, b_1, c_1, d_1, e_1, f_1, g_1)$, the vector $a_1$ corresponding to the methane concentration in the first vector may be removed to obtain the second vector $(b_1, c_1, d_1, e_1, f_1, g_1)$.

In step 460, the processing device 110 may remove an element corresponding to the sub detection data in the first target cluster center to obtain the second target cluster center.

The second target cluster center may be a cluster center after removing the corresponding vector of a sub detection data in the first target cluster center. For example, the first target cluster center may be $(A_1, B_1, C_1, D_1, E_1, F_1, G_1)$, the element $A_1$ corresponding to the methane concentration in the first target cluster center may be removed to obtain the second target cluster center $(B_1, C_1, D_1, E_1, F_1, G_1)$.

In step 470, the processing device 110 may determine whether the data detection unit corresponding to the sub detection data is an abnormal data detection unit based on the second distance between the second vector and the second target clustering center.

The abnormal data detection unit may be a data detection unit that detects an abnormality in the device. In some embodiments, the processing device 110 may calculate the second distance between the second vector and the second target cluster center, compare the second distance with a second threshold, and determine whether the data detection unit corresponding to the removed sub detection data is an abnormal data detection unit based on the comparison result. The value of the second threshold may be determined based on the user's actual experience in detecting the detection device. In some embodiments, when the second distance is greater than the second threshold, it is determined that the data detection unit is an abnormal data detection unit. When the second distance is less than or equal to the second threshold, it is determined that the data detecting unit is normal.

In some embodiments, steps 450-470 may be executed on each of sub detection data in the first detection data set to determine whether each data detection unit in the detection device is an abnormal data detection unit.

It should be understood that the distance between the first vector and the first target cluster center should be within the corresponding normal error range (e.g., the first threshold), the first vector being formed by the sub detection data obtained by the normal data detection unit. When the detection data unit is abnormal, the corresponding obtained sub detection data is also abnormal so as to cause the distance between the first vector and the first target clustering center to exceed the normal error range. Similarly, when the sub detection data in the second vector obtained by removing a certain sub detection data are normal sub detection data, the distance between the second vector and the second target clustering center should also be within the corresponding normal error range. When the distance between the second vector and the second target clustering center is not within the normal error range, it is indicated that there is abnormal sub detection data in the second vector. Therefore, when the element corresponding to a certain sub detection data is removed, the distance between the second vector and the second target clustering center returns to the corresponding normal error range (for example, the second threshold), it is indicated that the removed sub detection data is abnormal sub detection data, and its corresponding data detection unit is abnormal data detection unit. At the same time, all abnormal data detection units in the detection device may be determined based on processing results by removing and processing a certain sub detection data one by one.

According to some embodiments of the present disclosure, the first cluster center set may be determined through clustering the first historical detection data set, the first vector corresponding to the first detection data set may be determined based on the first detection data set, then the first target cluster center may be determined based on the first vector and the first cluster center set, finally, it may be determined whether the detection device is abnormal based on the first distance between the first vector and the first target clustering center, which further improves the accuracy of detection. In addition, according to some embodiments of the present disclosure, the specific abnormal data detection unit may be determined in the abnormal detection device by processing the sub detection data, so as to facilitate the subsequent maintenance only for the specific abnormal data detection unit, reduce the maintenance difficulty and cost, and improve the efficiency.

Figure 5:
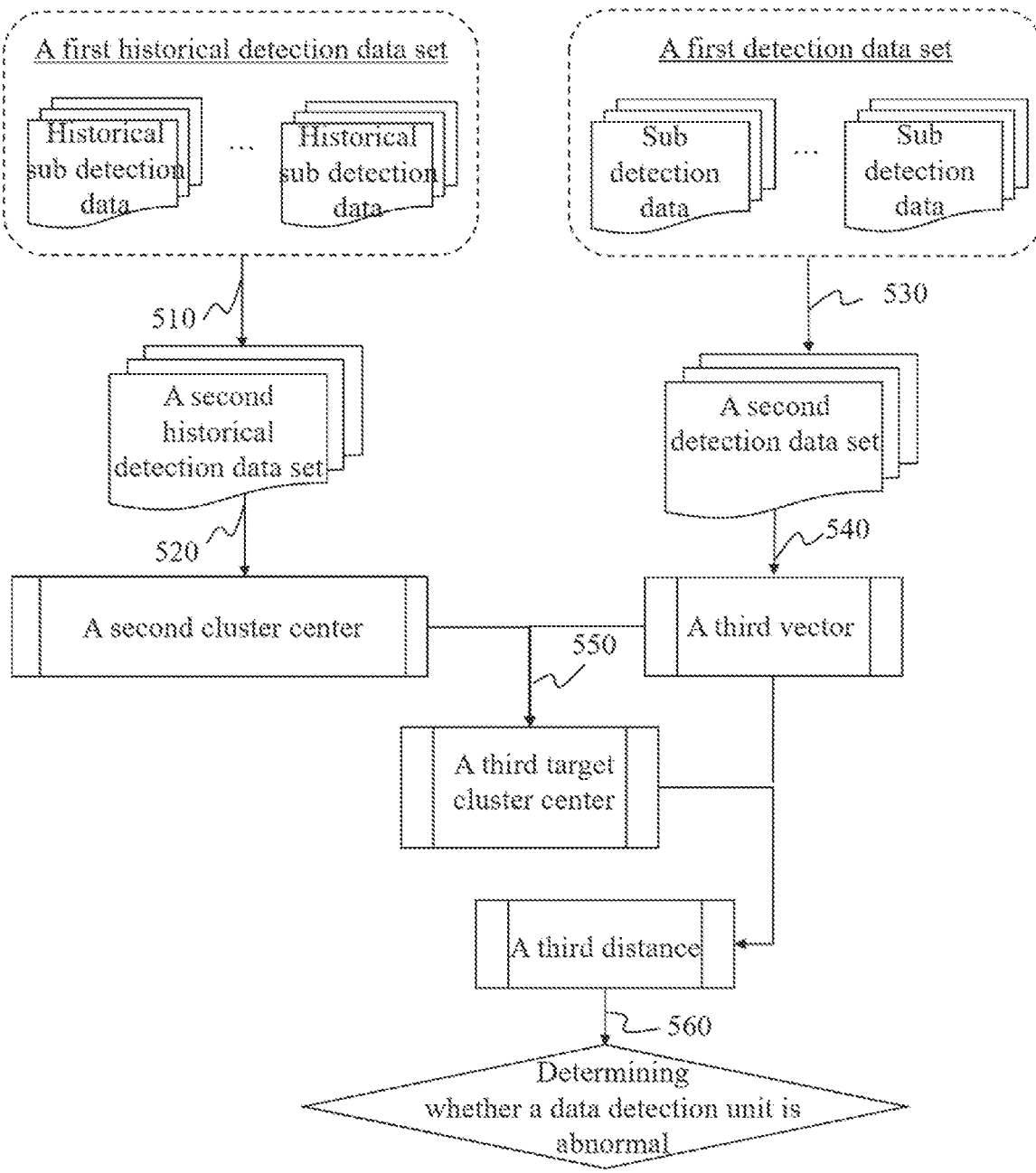
FIG. 5 is another schematic diagram illustrating an exemplary process for determining whether the detection device is abnormal according to some embodiments of the present disclosure.

FIG. 5 is another schematic diagram illustrating an exemplary process for determining whether the detection device is abnormal according to some embodiments of the present disclosure. In some embodiments, the process 500 may be executed by the determination module 220. As shown in FIG. 5, the process 500 may include the following steps:

In some embodiments, the following steps may be executed for each of sub detection data in the first detection data set:

In step 510, the processing device 110 may obtain a second historical detection data set through removing historical sub detection data corresponding to the sub detection data in the first historical detection data set.

The second historical detection data set may be a data set with removing the data corresponding to a certain sub detection data in the first historical detection data set. For example, the first historical detection data set may include methane concentration, hydrocarbon concentration, nitrogen concentration, oxygen concentration, carbon dioxide concentration, sulfide concentration, and the concentration of other substances. The methane concentration in the first historical detection data set may be removed to obtain the second historical detection data set including the hydrocarbon concentration, the nitrogen concentration, the oxygen concentration, the carbon dioxide concentration, the sulfide concentration, and the concentration of other substances.

In step 520, the processing device 110 may determine a second cluster center set based on the second historical detection data set.

In some embodiments, a feature vector of the second historical detection data set may be formed based on the second historical detection data set. The feature vectors of the plurality of second historical detection data sets may correspond to the plurality of second historical detection data sets respectively. In some embodiments, the elements in the feature vector of the second historical detection data set may correspond to the content of components in natural gas and/or the parameters in the second historical detection data set. For example, the feature vector of the second historical detection data set may be (b, c, d, e, f, g), where "b-g" represents six kinds of detection data related to natural gas in the second historical detection data set respectively. For example, "b" represents hydrocarbon concentration, "c" represents nitrogen concentration, "d" represents oxygen concentration, "e" represents carbon dioxide concentration, "f" represents sulfide concentration, and "g" represents the concentration of other substances. Similar to the feature vector of the first historical detection data set, the elements in the feature vector of the second historical detection data set may also include other detection data.

In some embodiments, the determination module 220 may cluster the feature vectors of the second historical detection data set to determine the second cluster center set through a clustering algorithm, and the second cluster center set may include one or more cluster centers. The method of clustering the second historical detection data set is similar to that of clustering the first historical detection data set. More descriptions regarding the second historical detection data set and the second clustering center set may be found elsewhere in the present disclosure, for example, FIG. 4 and its relevant descriptions thereof.

In step 530, the processing device 110 may obtain a second detection data set through removing the sub detection data from the first detection data set.

The second detection data set may be a data set with removing a certain sub detection data in the first detection data set. For example, the first detection data set may include methane concentration, hydrocarbon concentration, nitrogen concentration, oxygen concentration, carbon dioxide concentration, sulfide concentration, and concentrations of other substances. The methane concentration in the first detection data set may be removed to obtain the second detection data set including hydrocarbon concentration, nitrogen concentration, oxygen concentration, carbon dioxide concentration, sulfide concentration, and concentrations of other substances.

In step 540, the processing device 110 may determine a third vector corresponding to the second detection data set based on the second detection data set.

The third vector may be a feature vector corresponding to the second detection data set. The element of the third vector may correspond to the second detection data set. For example, the third vector is ($b_3$, $c_3$, $d_3$, $e_3$, $f_3$, $g_3$), where "$a_3$-$g_3$" respectively represents six kinds of detection data related to parameters of natural gas in the second detection data set. For example, "$b_3$" represents hydrocarbon concentration, "$c_3$" represents nitrogen concentration, "$d_3$" represents oxygen gas concentration, "$e_3$" represents carbon dioxide concentration, "$f_3$" represents sulfide concentration, and "$g_3$" represents the concentrations of other substances. The method of determining the third vector is similar to that of the feature vector of the first historical detection data set. More descriptions about the third vector may be found elsewhere in the present disclosure, for example, relevant descriptions of the first historical detection data set thereof.

In step 550, the processing device 110 may determine the third target cluster center based on the third vector and the second cluster center set.

The third target cluster center may refer to the cluster center closest to the third vector in the second cluster center set. In some embodiments, the cluster center corresponding to the shortest distance may be determined as the third target cluster center through calculating the distance between the third vector and each cluster center in the second cluster center set. For example, the third target cluster center with the shortest distance from the third vector is ($B_3$, $C_3$, $D_3$, $E_3$, $F_3$, $G_3$) by calculating the distance between the third vector and each cluster center in the second cluster center set. The method of calculating the distance may include Euclidean distance, cosine distance, Markov distance, Chebyshev distance, Manhattan distance, or the like, or any combination thereof.

In step 560, the processing device 110 may determine whether the data detection unit corresponding to the sub detection data is an abnormal data detection unit based on the third distance between the third vector and the third target clustering center.

The third distance may refer to the vector distance between the third vector and the third target cluster center. The method of obtaining the third distance may include Euclidean distance, cosine distance, Markov distance, Chebyshev distance, a Manhattan distance, or the like, or any combination thereof.

In some embodiments, the determination module 220 may compare the third distance with a third threshold and determine whether the data detection unit corresponding to the sub detection data is an abnormal data detection unit based on the comparison result. The third threshold may be determined based on the user's actual experience in detecting the data detection unit in the detection device. In some embodiments, when the third distance is greater than the third threshold, it is determined that the data detection unit corresponding to the sub detection data is an abnormal data detection unit. when the third distance is less than or equal to the third threshold, it is determined that the data detecting unit corresponding to the sub detection data is a normal data detection unit.

According to some embodiments of the present disclosure, the second historical detection data set and the second detection data set may be obtained respectively by removing the sub detection data in the first historical detection data set and the sub detection data in the first detection data set, the third vector corresponding to the second detection data set may be determined based on the second detection data set, the third target cluster center may be determined based on the third vector and the second cluster center set, it is determined whether the data detection unit corresponding to the sub detection data is an abnormal data detection unit based on the third distance between the third vector and the third target cluster center, which avoids judging the whole detection device, and quickly and accurately determine the abnormal data in the detection device for later maintenance and processing.

Figure 6:
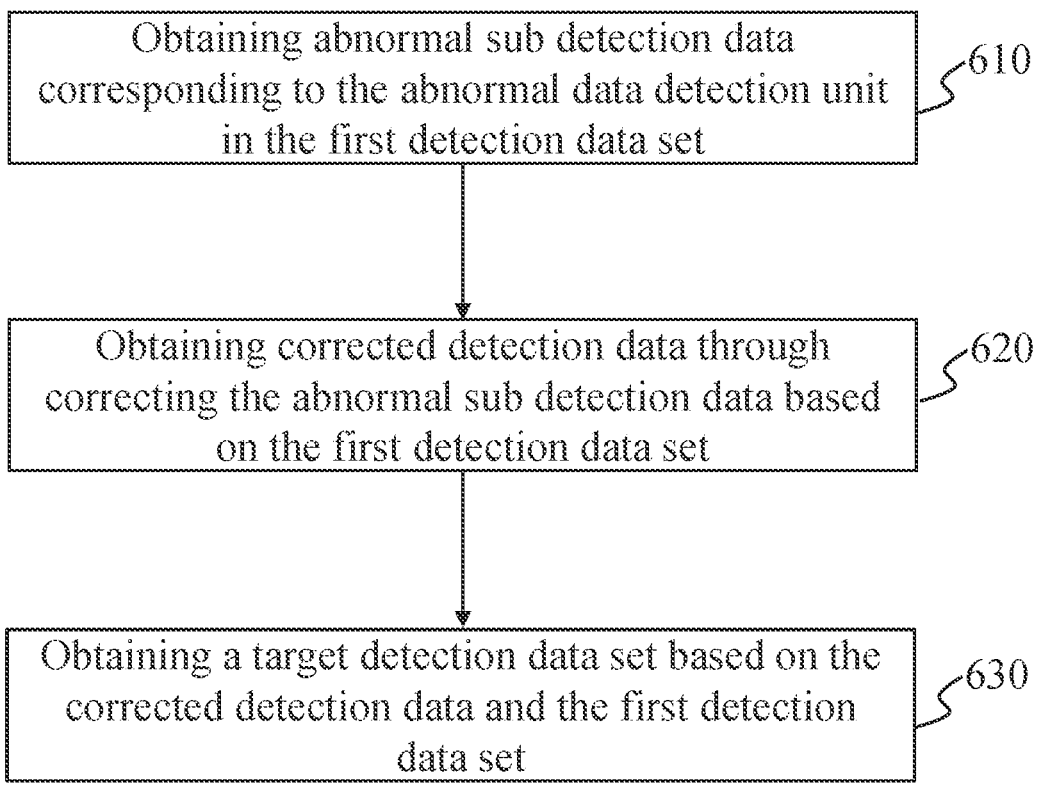
FIG. 6 is a flowchart illustrating an exemplary process for correcting detection data of a normal detection device according to some embodiments of the present disclosure.

FIG. 6 is a flowchart illustrating an exemplary process for correcting detection data of a normal detection device according to some embodiments of the present disclosure. In some embodiments, the process 600 may be executed by the determination module 220. As shown in FIG. 6, the process 600 may include the following steps:

In step 610, the processing device 110 may obtain abnormal sub detection data corresponding to the abnormal data detection unit in the first detection data set.

The abnormal sub detection data may refer to sub detection data in the first detection data set being abnormal.

In some embodiments, the abnormal detection data may be determined based on the abnormal data detection unit. The sub detection data corresponding to the abnormal data detection unit may be determined as the abnormal sub detection data. More descriptions regarding the abnormal data detection unit may be found elsewhere in the present disclosure, for example, FIGS. 4 and 5, and their relevant descriptions thereof.

In step 620, corrected detection data may be obtained through correcting the abnormal sub detection data based on the first detection data set.

The corrected detection data may refer to the corrected abnormal sub detection data. For example, the abnormal sub detection data is corrected to the normal range.

In some embodiments, the first detection data set with abnormal sub detection data may be analyzed and processed to obtain the corrected detection data corresponding to the abnormal sub detection data through modeling or using various data analysis algorithms, such as regression analysis, discriminant analysis, or the like.

In some embodiments, the corrected detection data may be obtained by fitting. For example, a fitting function between various detection data in the first detection data set may be obtained through fitting the first historical detection data set. The corrected detection data may be obtained through correcting the abnormal detection data based on the fitting function. The method of fitting may include linear fitting, nonlinear fitting, least square fitting, or the like, or any combination thereof.

In some embodiments, the third detection data set may be obtained through removing the abnormal sub detection data in the first detection data set.

The third detection data set may refer to a detection data set with removing all abnormal sub detection data in the first detection data set. For example, when the temperature sensor in the detection device is an abnormal data unit, the third detection data set may be obtained through removing the temperature data in the first detection data set.

In some embodiments, the correction detection data may be determined through processing the third detection data set based on a correction model.

The corrected detection data is detection data with correcting the abnormal detection data. The type of data in the corrected detection data may correspond to the type of abnormal sub detection data. For example, when the abnormal sub detection data is temperature data, the corrected detection data may be the corrected temperature data. As another example, when the abnormal sub detection data includes temperature data and pressure data, the corrected detection data may include corrected temperature data and corrected pressure data.

In some embodiments, an input of the correction model may be the third detection data set, and an output of the correction model may be the corrected detection data.

In some embodiments, the correction model may be obtained through training based on a plurality of first historical detection data sets. More descriptions regarding the first historical detection data set may be found elsewhere in the present disclosure, for example, FIG. 3 and its relevant descriptions. In some embodiments, the first historical detection data set after removing at least one sub detection data may be used as training samples, and the identification of the training sample may be at least one removed sub detection data. Multiple training samples with identification may be input into an initial correction model and parameters of the initial correction model may be updated through training. When the trained model meets the preset conditions, the training may be finished to obtain the trained correction model. In some embodiments, the correction model may include a support vector machine model, a naive Bayesian classification model, a Gaussian distribution Bayesian classification model, a decision tree model, a random forest model, a neural network model, or the like, or any combination thereof.

In some embodiments, the correction model may also be trained by masking. Specifically, a feature matrix of sample mask may be constructed: first, an initial matrix of the sample may be constructed based on the first historical detection data set, each vector in the initial matrix represents the type of detection data (for example, the composition, temperature, or pressure of natural gas, etc.), and the initial matrix may be divided into barrels to obtain the corresponding vector, then, a feature matrix of sample mask may be obtained by masking different types of detection data in the initial matrix of sample, then, the training samples may be trained based on the feature matrix of sample mask and its corresponding tags, where the tags are the matrix after the mask is restored. In some embodiments, a mask matrix may be input into the correction model to process and output the corrected detection data, and the mask matrix may be constructed based on the first detection data set including abnormal detection data.

According to some embodiments of the present disclosure, the corrected detection data may be determined through the model, which can improve the accuracy of the corrected detection data, make the corrected abnormal sub detection data more realistic, and reduce the labor cost.

In step 630, the processing device 110 may obtain the target detection data set based on the corrected detection data and the first detection data set.

The target detection data set may be a corrected first detection data set. In some embodiments, the target detection data set may be obtained through replacing the abnormal sub detection data in the first detection data set with the corrected detection data.

According to some embodiments of the present disclosure, the target detection data set may be obtained through correcting the abnormal sub detection data in the first detection data set, which may make that the target detection data set with normal detection data may also be obtained when the obtained first detection data set is abnormal, so as to carry out energy pricing based on the target detection data set and avoid pricing errors.

Some embodiments of the present disclosure also provide a device for detecting the detection device located the energy metering point of natural gas, which includes a processor for executing the method for detecting the detection device located the energy metering point of natural gas as described above.

In some embodiments, the first detection data set without abnormal sub detection data or the target detection data set may also be used as metering data of natural gas.

Figure 7:
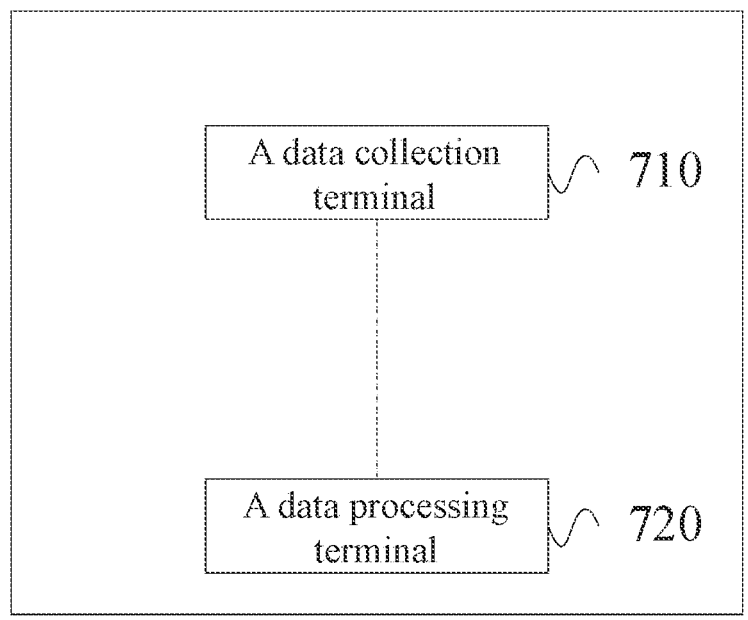
FIG. 7 is a schematic diagram illustrating an exemplary system for transmitting energy metering data of natural gas according to some embodiments of the present disclosure.

In order to facilitate the descriptions of the above method and device for transmitting energy metering data of natural gas, referring to FIG. 7, a communication architecture diagram of the detection system 700 applied to construction data disclosed in some embodiments of the present disclosure is provided. The detection system 700 applied to construction data may include a data collection terminal 710 and a data processing terminal 720, and the data collection terminal 710 is communicatively connected with the data processing terminal 720.

In some embodiments, the data processing terminal 720 may be a desktop computer, a tablet computer, a notebook, a computer, a mobile phone, or other data collection terminals capable of data processing and data communication.

Figure 8:
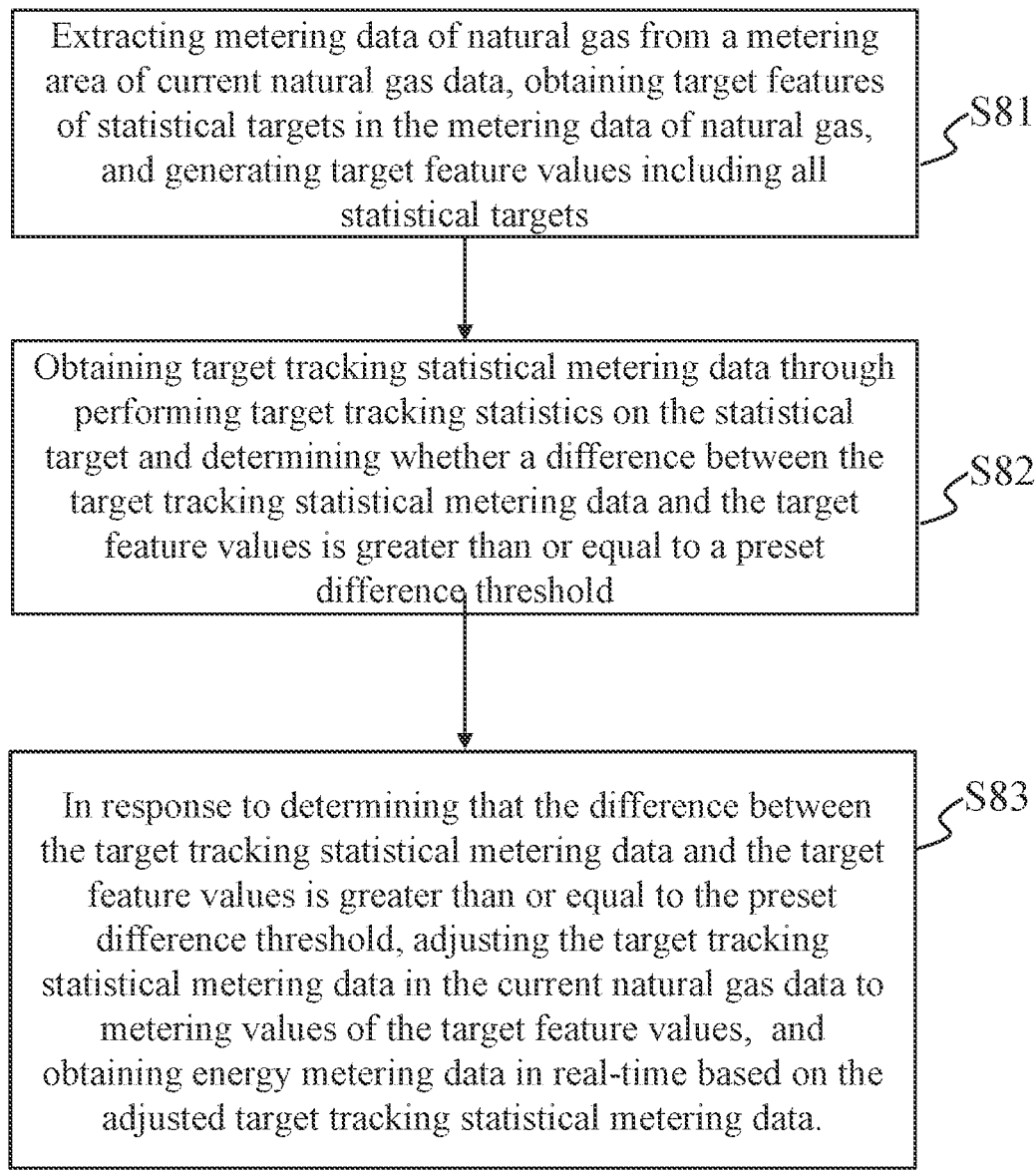
FIG. 8 is a flowchart illustrating an exemplary process of a method for transmitting energy metering data of natural gas according to some embodiments of the present disclosure.

In the above processing, referring to FIG. 8, some embodiments of the present disclosure provide a flowchart illustrating an exemplary process of a method for transmitting energy metering data of natural gas. The method for transmitting energy metering data of natural gas may be applied to the data collection terminal 710 in FIG. 7. Further, the method for transmitting energy metering data of natural gas may specifically include contents described in steps S81 to S83.

In step S81, metering data of natural gas may be extracted from a metering area of current natural gas data, target features of statistical targets in the metering data of natural gas may be obtained, and the target feature values may be generated. The target feature values may include all statistical targets.

In step S82, target tracking statistical metering data may be obtained through performing target tracking statistics on the statistical targets. It is determined whether a difference between the target tracking statistical metering data and the target feature values is greater than or equal to a preset difference threshold.

In step S83, in response to determining that the difference between the target tracking statistical metering data and the target feature value is greater than or equal to the preset difference threshold, the target tracking statistical metering data in the current natural gas data may be adjusted to metering values of the target feature values. The energy metering data may be obtained in real-time based on the adjusted target tracking statistical metering data.

Understandably, according to the above method, the metering data of natural gas may be extracted from the metering area of the current natural gas data, the target features of the statistical targets in the metering data of natural gas may be obtained, and the target feature values may be generated. The target tracking statistical metering data may be obtained through performing target tracking statistics on the statistical targets. It is determined whether the difference between the target tracking statistical metering data and the target feature values is greater than or equal to the preset difference threshold. In response to determining that the difference between the target tracking statistical metering data and the target feature values is greater than or equal to the preset difference threshold, the target tracking statistical metering data in the current natural gas data may be adjusted to the metering values of the target feature values. The energy metering data may be obtained in real-time based on the target tracking statistical metering data.

Accordingly, the target tracking statistical metering data is adjusted through the metering values of the target feature values so as to determine the target tracking statistical metering data, which ensures accuracy of target tracking statistics and improves accuracy of real-time energy metering data.

In the actual operation, it is found that when the target features of the statistical targets in the metering data of natural gas are obtained and the target feature values are generated, there is a problem of statistical features with error, so it is difficult to correctly generate the target feature values. In order to improve the above technical problem, the step S81 of obtaining the target features of the statistical targets in the metering data of natural gas and generating the target feature values may specifically include contents described in the following steps S811 and S812.

In step S811, the statistical targets may be determined in the metering data of natural gas and energy generation features of the statistical targets may be obtained.

In step S812, a matching degree between the energy generation features and a preset metering model may be obtained. In response to determining that the matching degree is greater than or equal to a first preset threshold of matching degree, the target feature values may be generated.

Understandably, when the contents described in the above steps S811 and S812 are executed, the problem of statistical features with error is avoided while obtaining the target features of the statistical targets in the metering data of natural gas and generating the target feature values so as to generate correctly the target feature values.

Based on the above basis, the method also includes contents described in the following steps A1 to A4 after generating the target feature values:

In step A1, a service calculation data frame corresponding to the target feature values may be determined, the service calculation data frame may be used to record energy values of the target feature values, and the energy values may include preset service metering data type and service calculation data values corresponding to the preset service metering data types.

In step A2, according to the service calculation data values of the target feature values, the statistical targets in the metering area may be divided and the types of the statistical targets may be determined based on the preset service metering data types, the metering area may be divided into a plurality of unit metering sub areas including a plurality of service calculation data frames formed by target service calculation data frames.

In step A3, it is determined whether the service calculation data frame records historical service calculation data values corresponding to the types of the statistical targets, in response to determining that the service calculation data frames do not record the historical service calculation data values corresponding to the types of the statistical targets, the energy values of the target feature values are set to the energy values in the service calculation data frames.

In step A4, in response to determining that the service calculation data frames record the historical service calculation data values corresponding to the type of the statistical targets, an average value of the service calculation data values of the target frames and the historical service calculation data values may be calculated, and the average value may be set to the service calculation data values corresponding to the type of the statistical targets in the service calculation data frames.

Understandably, when the contents described in the above steps A1 to A4 are executed, the target feature values may be processed accurately, so as to effectively ensure accurate calculation of the target feature values.

In the actual operation, it is found that when the statistical targets in the metering data of natural gas are determined, there is a problem of inaccurate metering, so it is difficult to accurately obtain the energy generation features of the statistical targets. In order to improve the above technical problems, the step S811 of determining the statistical targets in the metering data natural gas and obtaining the energy generation features of the statistical targets may specifically include the contents described in the following steps S1 to S5.

In step S1, in response to determining that a previous group of metering data meets a preset condition, the same type of service calculation data values, which are recorded in all service calculation data frames in the metering data of natural gas of the previous group of metering data, may be counted based on the energy values recorded in the service calculation data frames of the previous group of metering data.

In step S2, an average value of the same type of service calculation data values in the metering data of natural gas of the previous group of metering data may be calculated and the average value may be used as an average value of the corresponding type of service calculation data.

In step S3, scaled metering data may be obtained through preset dividing the corresponding average value of the service calculation data and scaling the metering data of natural gas in the current natural gas data based on a scaling coefficient, and the statistical targets may be determined in the scaled metering data. The scaling coefficient is a comparison value between the average value of the service calculation data corresponding to the preset division in the previous set of metering data and the service calculation data values corresponding to the preset metering model.

In step S4, the energy values of the service calculation data frames in the unit metering sub area are characterized and integrated based on the preset service metering data type to obtain the energy values of all service calculation data frames in the unit metering sub area under each preset service metering data type.

In step S5, energy generation features of the statistical targets may be obtained respectively based on the energy values of all service calculation data frames under each preset service metering data type.

Understandably, when the contents described in the above steps S1 to S5 are executed, the problem of inaccurate metering is avoided while determining the statistical targets in the metering data of natural gas, so as to accurately obtain the energy generation features of the statistical targets.

In the actual operation, it is found that when the target tracking statistics is performed on the statistical targets, there is a problem of tracking with error, so it is difficult to accurately obtain the target tracking statistical metering data. In order to improve the above technical problems, the step S82 of performing target tracking statistics on the statistical targets to obtain the target tracking statistical metering data may specifically include the contents described in the following steps S821 to S824.

In step S821, a center point of the target feature values of the statistical targets in the previous set of metering data may be obtained and the target tracking statistical point of the current natural gas data may be obtained through iterations based on the central point.

In step S822, target tracking statistical frames may be generated using target tracking statistical point as the central point, and it is determined whether the matching degree between the target tracking statistical frames and the target tracking statistical frames generated by the previous set of metering data is greater than or equal to a second preset threshold of matching degree.

In step S823, in response to determining that the matching degree between the target tracking statistical frames and the target tracking statistical frames generated by the previous set of metering data is greater than or equal to the second preset matching degree threshold, the metering values of the target tracking statistical frames may be determined as the target tracking statistical metering data of the statistical targets.

In step S824, in response to determining that the difference between the target tracking statistical metering data and the target feature values is greater than the preset difference threshold, the method further includes: performing the target tracking statistics on the target feature values and the target tracking statistical metering data in the subsequent group of metering data, when the target tracking statistical metering data is not changed in the group metering data of continuously preset groups, the target tracking statistics is stopped performing on the target tracking statistical metering data.

Understandably, when the contents described in the above steps S821 to S824 are executed, the problem of tracking with error is avoided while tracking and counting the statistical targets, so as to accurately obtain the target tracking statistical metering data.

In the actual operation, it is found that when the energy metering data are obtained in real-time based on the target tracking statistical metering data, there is a problem of metering with error, so it is difficult to meter reliably. In order to improve the above technical problems, the step S83 of obtaining energy metering data in real-time based on the target tracking statistical metering data may specifically include the contents described in the following steps S831 to S833.

In step S831, current metering values of the statistical targets in the metering area are determined based on the target feature values and the target tracking statistical metering data and starting metering values of the statistical targets appeared in the metering area for the first time is obtained.

In step S832, in response to determining that a difference between the current metering values and the metering values of the preset boundary trigger line is less than or equal to a third preset difference threshold, cosine vectors from the starting metering values to the current metering values are determined.

In step S833, the values of the statistical targets whose cosine vectors are consistent with a preset direction and the values of the statistical targets whose cosine vectors are inconsistent with the preset direction may be counted.

Understandably, when the contents described in the above steps S831 to S833 are executed, the problem of metering with error is avoided while obtaining the energy metering data in real-time based on the target tracking statistical metering data, so as to meter reliably.

Based on the same inventive concept, a system for transmitting energy metering data of natural gas is also provided, which includes a user platform, a service platform, a management platform, a sensing network platform, and a sensing control platform. The user platform is communicatively connected with the service platform, and the service platform is communicatively connected with the management platform, the management platform is communicatively connected with the sensing network platform, the sensing network platform is communicatively connected with the sensing control platform, the sensing network platform also includes a data collection terminal and a data processing terminal, the data collection terminal is communicatively connected with the data processing terminal, and the data processing terminal is configured to: extract the metering data of natural gas from the metering area of the current natural gas data, obtain the target features of the statistical targets in the metering data of natural gas, and generate the target feature values, the target feature values including all statistical targets; obtain the target tracking statistical metering data through performing target tracking statistics on the statistical targets, determining whether the difference between the target tracking statistical metering data and the target feature values is greater than or equal to the preset difference threshold; in response to determining that the difference between the target tracking statistical metering data and the target feature values is greater than or equal to the preset difference threshold, adjust the target tracking statistical metering data in the current natural gas data to the metering values of the target feature values, and obtain the energy metering data in real-time based on the adjusted target tracking statistical metering data.

Figure 9:
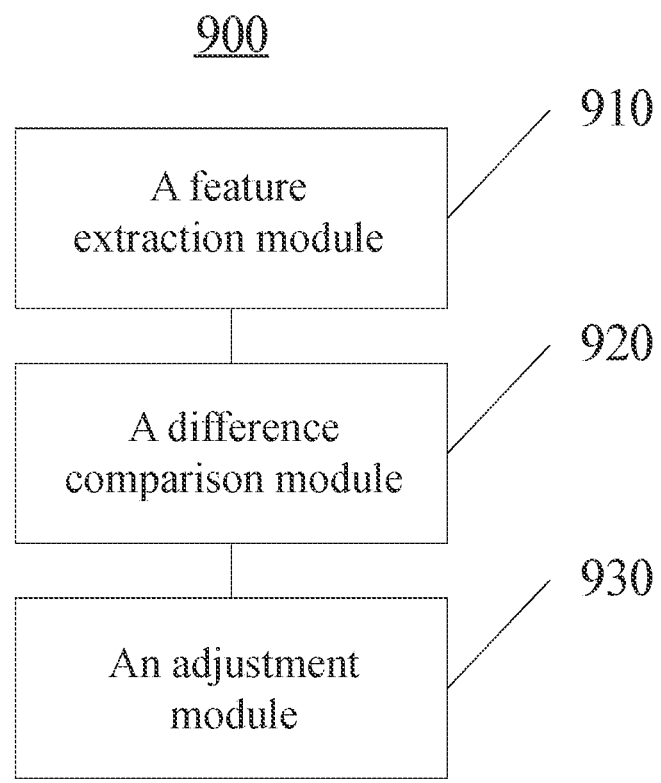
FIG. 9 is a block diagram illustrating an exemplary device for transmitting energy metering data of natural gas according to some embodiments of the present disclosure.

Based on the same inventive concept described above, referring to FIG. 9, a functional block diagram of a device 900 for transmitting energy metering data of natural gas is also provided. The device 900 for transmitting energy metering data of natural gas is described in detail below.

A device 900 for transmitting energy metering data of natural gas is applied to the data processing terminal. The device 900 includes: a feature extraction module 910 configured to extract metering data of natural gas from the metering area of the current natural gas data, obtain the target features of the statistical targets in the metering data of natural gas, and generate the target feature values, the target feature values including all statistical targets; a difference comparison module 920 configured to perform target tracking statistics on the statistical targets to obtain target tracking statistical metering data, determine whether the difference between the target tracking statistical metering data and the target feature values is greater than or equal to the preset difference threshold; an adjustment module 930 configured to adjust the target tracking statistical metering data in the current natural gas data to the metering values of the target feature values in response to determining that the difference between the target tracking statistical metering data and the target feature values is greater than or equal to the preset difference threshold, and obtain the energy metering data in real-time based on the adjusted target tracking statistical metering data.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. An early warning method for a detection device located at an energy metering point of natural gas, comprising:
    obtaining a first detection data set collected by the detection device located at the energy metering point of the natural gas, wherein the first detection data set includes sub detection data respectively collected by at least two data detection units of the detection device;
    determining a first cluster center set through clustering a first historical detection data set;
    determining a first vector corresponding to the first detection data set based on the first detection data set;
    determining a first target cluster center based on the first vector and the first cluster center set; and
    determining whether the detection device is abnormal based on a distance between the first vector and the first target cluster center;
    in response to determining that the detection device is abnormal, for each of the sub detection data in the first detection data set,
        obtaining a second vector through removing an element corresponding to the sub detection data from the first vector;
        obtaining a second target clustering center through removing an element corresponding to the sub detection data from the first target clustering center; and
        determining whether the data detection unit corresponding to the sub detection data is an abnormal data detection unit based on a second distance between the second vector and the second target clustering center.

2. The method of claim 1, further comprising:
    obtaining abnormal sub detection data corresponding to the abnormal data detection unit in the first detection data set;
    obtaining corrected detection data through correcting the abnormal sub detection data based on the first detection data set; and
    obtaining a target detection data set based on the corrected detection data and the first detection data set.

3. The method of claim 2, wherein the obtaining corrected detection data through correcting the abnormal sub detection data based on the first detection data set includes:
    obtaining a fitting function between various detection data in the first detection data set through fitting the first historical detection data set; and
    obtaining the corrected detection data through correcting the abnormal sub detection data based on the fitting function.

4. The method of claim 2, wherein the obtaining corrected detection data through correcting the abnormal sub detection data based on the first detection data set includes:
    obtaining a third detection data set through removing the abnormal sub detection data in the first detection data set; and determining the corrected detection data through processing the third detection data set based on a correction model, wherein the correction model is a machine learning model.

5. The method of claim 4, wherein the correction model is obtained by training including:
obtaining a trained correction model through inputting a plurality of training samples with identification into an initial correction model and updating parameters of the initial correction model by training, wherein
the plurality of training samples are determined based on the first historical detection data set after removing at least one sub detection data, and the identification is the at least one removed sub detection data.

6. The method of claim 4, wherein the correction model is obtained by training including:
constructing a sample initial matrix based on the first historical detection data set, wherein each vector in the sample initial matrix represents a type of detection data;
obtaining a sample mask feature matrix through masking different types of detection data in the sample initial matrix;
obtaining a trained correction model through training an initial correction model based on the sample mask feature matrix and a corresponding tag as training samples and updating parameters of the initial correction model through training, wherein the tag of the training samples is the matrix after mask is restored.

7. An early warning system for a detection device located at an energy metering point of natural gas, comprising:
at least one storage medium storing a set of instructions; and
at least one processor in communication with the at least one storage medium to execute the set of instructions to perform operations comprising:
obtaining a first detection data set collected by the detection device located at the energy metering point of the natural gas, wherein the first detection data set includes sub detection data respectively collected by at least two data detection units of the detection device;
determining a first cluster center set through clustering a first historical detection data set;
determining a first vector corresponding to the first detection data set based on the first detection data set;
determining a first target cluster center based on the first vector and the first cluster center set; and
determining whether the detection device is abnormal based on a distance between the first vector and the first target cluster center;
in response to determining that the detection device is abnormal, for each of the sub detection data in the first detection data set,
obtaining a second vector through removing an element corresponding to the sub detection data from the first vector;
obtaining a second target clustering center through removing an element corresponding to the sub detection data from the first target clustering center; and
determining whether the data detection unit corresponding to the sub detection data is an abnormal data detection unit based on a second distance between the second vector and the second target clustering center.

8. The system of claim 7, wherein the at least one processor is further configured to:

obtain abnormal sub detection data corresponding to the abnormal data detection unit in the first detection data set;
obtain corrected detection data through correcting the abnormal sub detection data based on the first detection data set; and
obtain a target detection data set based on the corrected detection data and the first detection data set.

9. The system of claim 8, wherein to obtain corrected detection data through correcting the abnormal sub detection data based on the first detection data set, the at least one processor is further configured to:
obtain a fitting function between various detection data in the first detection data set through fitting the first historical detection data set; and
obtain the corrected detection data through correcting the abnormal sub detection data based on the fitting function.

10. The system of claim 8, wherein to obtain corrected detection data through correcting the abnormal sub detection data based on the first detection data set, the at least one processor is further configured to:
obtain a third detection data set through removing the abnormal sub detection data in the first detection data set; and
determine the corrected detection data through processing the third detection data set based on a correction model.

11. The system of claim 10, wherein the correction model is obtained by training, and to training the correction model, the at least one processor is configured to:
obtain a trained correction model through inputting a plurality of training samples with identification into an initial correction model and updating parameters of the initial correction model by training, wherein
the plurality of training samples are determined based on the first historical detection data set after removing at least one sub detection data, and the identification is the at least one removed sub detection data.

12. The system of claim 10, wherein the correction model is obtained by training, and to training the correction model, the at least one processor is configured to:
construct a sample initial matrix based on the first historical detection data set, wherein each vector in the sample initial matrix represents a type of detection data;
obtain a sample mask feature matrix through masking different types of detection data in the sample initial matrix; and
obtain a trained correction model through training an initial correction model based on the sample mask feature matrix and a corresponding tag as training samples and updating parameters of an initial correction model through training, wherein the tag of the training samples is the matrix after mask is restored.

13. A non-transitory computer readable medium storing instructions, when executed by at least one processor, causing the at least one processor to implement an early warning method comprising:
obtaining a first detection data set collected by a detection device located at the energy metering point of natural gas, wherein the first detection data set includes sub detection data respectively collected by at least two data detection units of the detection device;
determining a first cluster center set through clustering a first historical detection data set;
determining a first vector corresponding to the first detection data set based on the first detection data set;

determining a first target cluster center based on the first vector and the first cluster center set; and determining whether the detection device is abnormal based on a distance between the first vector and the first target cluster center;

in response to determining that the detection device is abnormal, for each of the sub detection data in the first detection data set, obtaining a second vector through removing an element corresponding to the sub detection data from the first vector;

obtaining a second target clustering center through removing an element corresponding to the sub detection data from the first target clustering center; and determining whether the data detection unit corresponding to the sub detection data is an abnormal data detection unit based on a second distance between the second vector and the second target clustering center.

* * * * *